(12) United States Patent
Meyers et al.

(10) Patent No.: US 7,982,340 B1
(45) Date of Patent: *Jul. 19, 2011

(54) TELECOMMUNICATIONS MEGASITE WITH BACKUP POWER SYSTEM

(75) Inventors: Jerry Meyers, Overland Park, KS (US); Julie A. Willets, Overland Park, KS (US); Larry L. Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,514

(22) Filed: Apr. 9, 2010

Related U.S. Application Data

(63) Continuation of application No. 11/326,257, filed on Jan. 5, 2006, now Pat. No. 7,728,458.

(51) Int. Cl.
*H02J 9/00* (2006.01)
(52) U.S. Cl. .......................................................... 307/66
(58) Field of Classification Search ...................... 307/66
See application file for complete search history.

(56) References Cited

U.S. PATENT DOCUMENTS

| 6,011,324 | A * | 1/2000 | Kohlstruck et al. | 307/64 |
| 7,098,557 | B2 * | 8/2006 | Swanson et al. | 307/66 |
| 7,250,231 | B2 * | 7/2007 | Edlund | 429/429 |
| 2004/0131901 | A1 * | 7/2004 | Yamashita et al. | 429/17 |

* cited by examiner

*Primary Examiner* — Jared J Fureman
*Assistant Examiner* — Dru M Parries

(57) ABSTRACT

The present invention is an energy generating system for a telecommunications megasite which uses fuel cells and capacitors to backup a commercially available primary source of power.

20 Claims, 2 Drawing Sheets

US 7,982,340 B1

TELECOMMUNICATIONS MEGASITE WITH BACKUP POWER SYSTEM

PRIORITY

This application is a continuation of application Ser. No. 11/326,257, filed 5 Jan. 2006, which is incorporated herein by reference.

FIELD OF THE INVENTION

In general, this invention is a reliable power system. In one embodiment, the invention is a system for providing backup DC power systems using fuel cells to cover power losses in large telecommunications facilities.

BACKGROUND OF THE INVENTION

Traditionally, telecommunications facilities have relied on a commercial power utility as their primary source for electrical power. In the case of a sudden power loss, e.g., a blackout or other disturbance in the commercial power grid, some sort of backup system is necessary to maintain power to the telecommunications equipment.

Most facilities use a diesel generator and an array of batteries as backup power sources. Operationally, if power from the commercial utility is lost, the diesel generator is activated to supply power to the facility. It takes time for the diesel generator to come on line, though. Because of this, the battery array provides power during the time it takes to switch from the utility source to the diesel generated source. If the generator also fails (e.g., if the generator breaks down or runs out of fuel), then the battery array is able to provide power for an additional (but limited) period of time.

With respect to the batteries used, conventional systems use valve-regulated lead-acid (VRLA) batteries. These batteries have limitations. First, VRLA batteries produce harmful and corrosive gases. Thus, they require adequate ventilation. Ventilation is required by environmental protection agency (EPA) standards. Second, VRLAs take up considerable space. Because of this, users normally have to dedicate large areas in the plant, and perhaps even multiple rooms, just to house them. Other limitations include that VRLAs have limited life spans and require continual maintenance. Over their life cycle, the VRLAs continually degrade, thus, their charge-holding capacities become reduced over time until the battery has become unable to properly function and must be discarded.

SUMMARY OF THE INVENTION

The present invention encompasses a power system for a telecommunications facility. The system, in one embodiment, includes a fuel cell which operates along with bridging capacitors. This arrangement makes the use of VRLA or any other battery unnecessary.

BRIEF DESCRIPTION OF THE DRAWINGS

The present invention is described in detail below with reference to the attached drawing figures, wherein.

DETAILED DESCRIPTION OF THE INVENTION

The present invention, in one embodiment, works along with a power system for a telecommunications facility. The disclosed embodiment uses.

Figure 1:
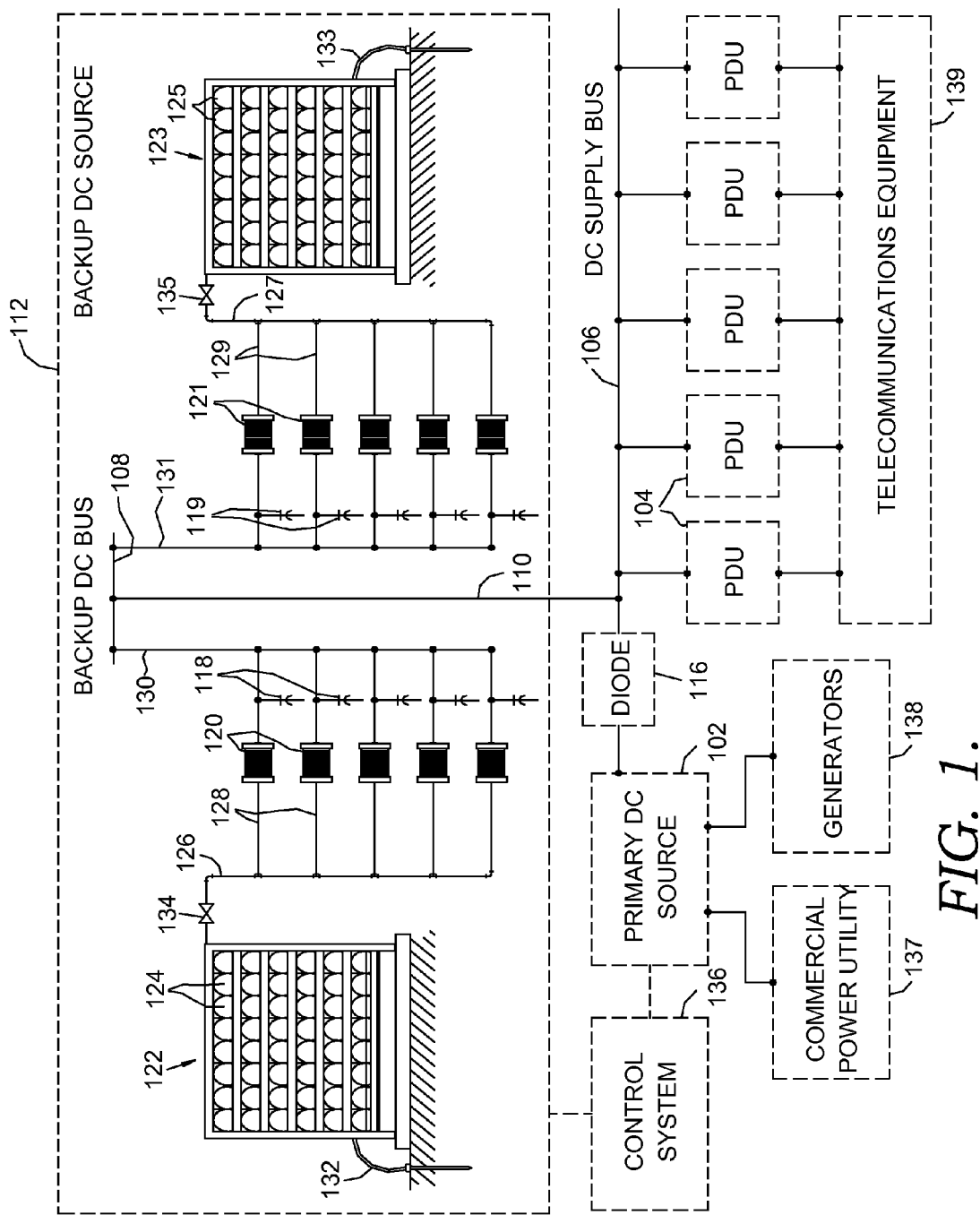
FIG. 1 is a schematic diagram showing one embodiment of the system of the present invention.
Figure 2:
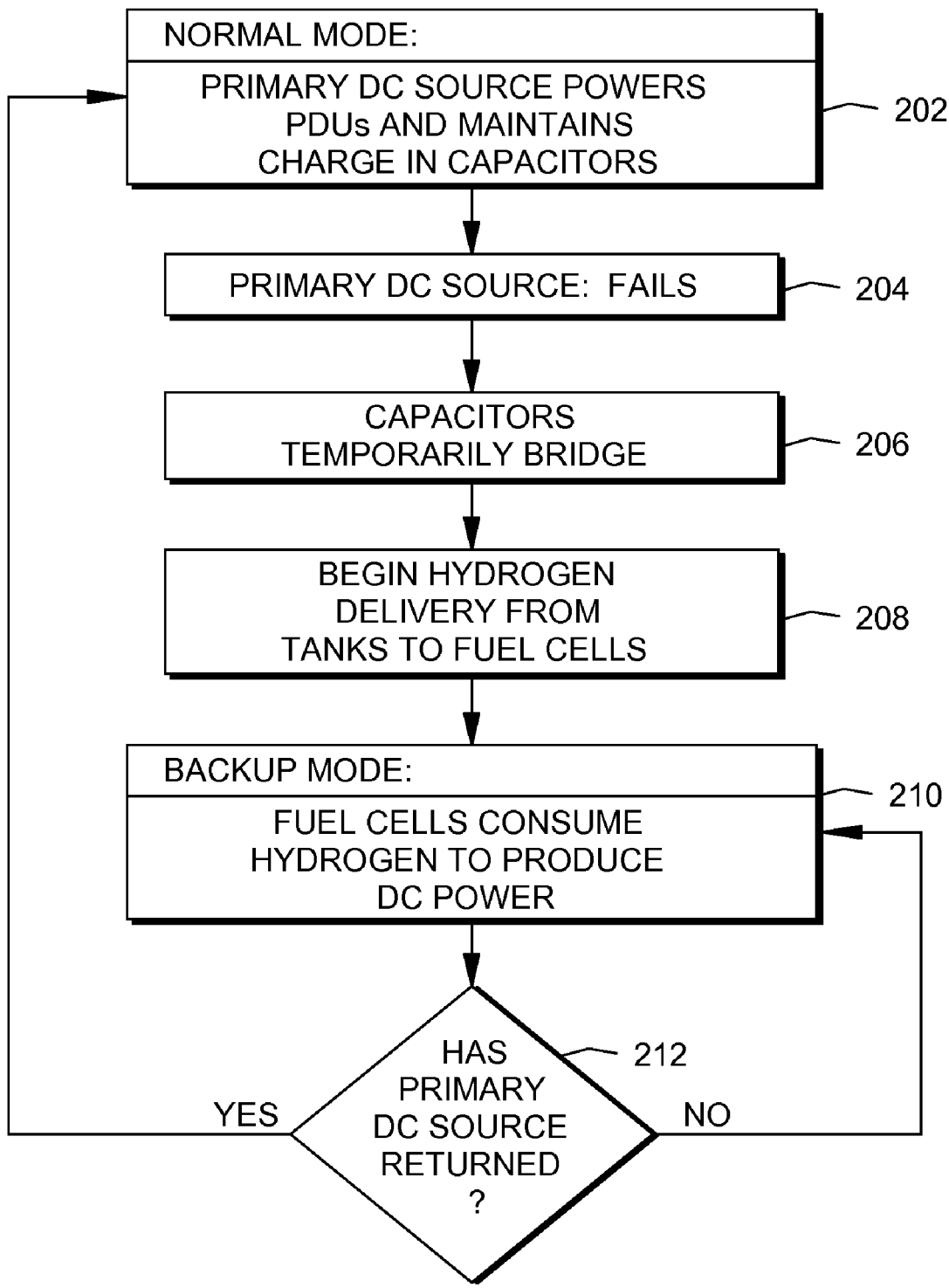
FIG. 2 is a flow diagram showing the backup-power-management processes of the present invention.

The present invention is best understood in connection with the schematic diagram of FIG. 1 and the flow diagram of FIG. 2. Referring first to FIG. 1, a schematic shows the components of one embodiment for a novel power system.

An important objective in a typical telecommunications facility is to maintain DC power to a plurality of DC power distribution units (PDUs) 104—five in the preferred embodiment. The PDUs supply power to telecommunications equipment 139 (e.g., routers, switches, servers). To do this, each of the five PDUs 104 are included on a DC bus 106. Bus 106 is the primary DC circuit. It is important that adequate DC power is maintained to bus 106 so that the facilities telecommunications equipment 139 remains functional at all times. In the preferred embodiment, each of the five PDUs in the facility has individual requirements of 400 A, 48V DC. This makes the minimum total power requirements of the bus 2000 A, 48V DC (100 KW). In the preferred embodiment, however, 54V DC is maintained at bus 106 in order to avoid any adverse effect of small voltage dips. The broad concepts of the present invention could, of course, be employed for the purpose of meeting other requirements, larger or smaller.

In the disclosed embodiment, the primary source of DC power is received from a primary DC power source 102. Normally, source 102 will be electrical power derived from a commercial utility 137. The AC provided must be converted to DC power using some sort of conversion system (not shown). This system will most likely include a plurality of conversion devices, such as inverters or rectifiers. In the preferred embodiment, the conversion devices are rectifiers.

Also optionally included in the primary source 102 of the FIG. 1 embodiment is a plurality of diesel backup generators 138. These devices are known in the art, and an artisan will understand that, although they generate AC power, their outputs may be arranged along with the conversion devices such that they can be activated should commercial utility 137 become unavailable, e.g., in a blackout. Regardless of the AC source, once converted, the DC power is presented into bus 106.

Between primary DC source 102 and PDUs 104 in bus 106 is a back-feed diode 116. Back-feed diode 116 allows the flow of current in only one direction—from source 102 into bus 106. This prevents power losses from other locations in the FIG. 1 schematic from being dissipated back into primary source 102 when the power to bus 106 is being maintained by backup DC source capacitors 118 and 119 and fuel cells 120 and 121 if primary source 102 has failed. By preventing power from feeding back into primary source 102, the backup DC source is able to fully supply bus 106.

If primary DC source 102 is in a state of complete failure (e.g., the commercial power grid is down and diesel generators 138 are inoperable because of mechanical reasons or fuel unavailability) the backup DC source is called into action. This involves the activation of the fuel cells in the system. In the disclosed embodiment, two separate banks of fuel cells are used. A first bank includes five fuel cells 120 which are all in parallel on a circuit 130. A second bank includes another five fuel cells 121 which are in parallel on a circuit 131. Both of circuits 130 and 131 are included on a backup DC bus 108 which serves as the main backup conduit in the FIG. 1 schematic. Backup bus 108 is electrically connected into DC supply bus 106 by a linking circuit 110 which allows the PDUs 104 to be electrically backed up.

Fuel cells are electrochemical-energy-conversion devices. They utilize hydrogen and oxygen. Proton exchange membranes (PEMs) or other equivalent devices, in fuel cells cause the electron from hydrogen to be removed temporarily. Later, this hydrogen electron is returned when the hydrogen is combined with the oxygen to produce water. This creates electricity. The reaction is entirely noncombustive, and generates DC electrical power. Because the only by products of this reaction are heat, water, and electricity, a fuel cell is friendly to the environment. In addition, a fuel cell is capable of providing electrical power for as long as hydrogen fuel is supplied to the unit. It does not discharge over time like a battery.

In the preferred embodiment disclosed in FIG. 1, each of fuel cells included in banks 120 and 121 include a plurality of PEMs. In the preferred embodiment, each of fuel cells 120 and 121 are 200 A, 54V (10 KW) PEM-type fuel cells which are manufactured by Hydrogenics of Ontario, Canada. Other specifications are possible, however, so long as they meet the 48V and other electrical requirements. The additional voltage rating of the preferred embodiment is intended to cover voltage drops.

Hydrogen fuel is delivered to the PEMS in the fuel cells via hydrogen conduits from pressurized hydrogen tanks. Each group of fuel cells (120 and 121) are supplied by a plurality of typical bumpstop "T" bottles (48 in the preferred embodiment). The first bank five fuel cells 120 are supplied by a first rack 122 of bumpstop bottles 124. The second bank of fuel cells 121 are supplied by a second rack 123 of bumpstop bottles 125. These gaseous hydrogen storage arrangements are commercially available. In accord with regulatory requirements, each of racks 122 and 123 are grounded using ground wires 132 and 133, respectively.

Though fuel cell 120 used in the preferred embodiment has been shown and described herein as using PEMs, other fuel-cell technologies exist which might be used instead and still fall within the scope of the present invention.

FIG. 1 also shows the inclusion of a first group 118 and a second group 119 of capacitors. Each capacitor is electrically connected into the output of a particular fuel cell, and thus, also into backup DC bus 108. Because of this arrangement, the capacitors are continuously charged so long as there is an active source of power in the system. Thus, if any of primary DC source 102 or fuel cells 120 and 121 are operational, DC electricity will be supplied to bus 108, and this will maintain a charge in capacitors 118. In the preferred embodiment, 2,500 F supercapacitors are used. These kinds of supercapacitors are known and commercially available.

The stored charge in the capacitors is used for bridging purposes. Primarily during the startup of the fuel cells 120 and 121. It takes about 14 seconds for the fuel cells to come online to the point that they are consuming hydrogen and generating DC power to the extent that they can meet the bus load requirements. Capacitors 120 and 121 are capable of handling the down time which occurs, and thus, effectively bridge the power gap created.

An embodiment of the present invention includes a control system 136 which includes a number of sensing and control mechanisms (not shown) for determining when fuel cells 120 and 121 need to be activated. One advantage of the system disclosed in FIG. 1 is that the capacitors 118 and 119 are always on line and do not need any activation. The fuel cells, however, must be activated using the control system. One way in which the control system can be set up to recognize the need for fuel cell activation is to locate a voltage sensor at primary DC source 102 or in bus 106. When this sensor detects voltages falling below the 48 VDC requirements, the control system will open up automated valves 134 and 135 between the tanks 124 and 125 and the fuel cells 120 and 121 so that the hydrogen can be delivered for consumption.

The FIG. 1 system also includes In the preferred embodiment, first and second common lines 126 and 127 are provided. Line 126 is then divided into individual lines 128 which run into the fuel cell inputs for each of the first group of fuel cells 120. The second group 121 is identically served by a plurality of individual lines 129 which all spawn from line 127.

The processes of voltage monitoring, opening of the automated valves to cause activation of the fuel cells, and the closing of the valves when the fuel cell is no longer needed, are all managed, in the preferred embodiment, using one or more programmable logic controllers (PLCs). Other automated arrangements could be used as well, however, and still fall within the scope of the present invention. One skilled in the art will recognize that automated systems may be separate devices, or may be integral to the valves, bus lines, and/or devices being monitored. Likewise, the control mechanisms may be separate devices, such as programmable logic controllers used in the preferred embodiment, or may be integrated into the components already described. The control arrangement is not critical to the broad concepts of the invention.

A power-management flow chart 200 of FIG. 2 shows different contingency plans in the event that the primary DC source 102 is inoperable for some reason.

As a preliminary measure, a step 202 provides a starting point for the process when in a normal mode of operation. This assumes the components of the system have already been set in place, the primary DC power source 102 is available (e.g., one of the commercial utility 137 or diesel generators 138), and that capacitors 120 and 121 are charged. In normal mode, primary DC source 102 carries the load for the facility. At the same time, the charges in capacitors 120 and 121 are maintained. The fuel cells 120 are inactive in normal mode.

If, however, the primary DC source 102 fails as shown in a next step 204, the capacitors will temporarily bridge in a step 206. At the same time, control system 136 will recognize the voltage drop of the primary DC source, and start up the fuel cells 120 and 121 which requires the delivery of hydrogen as disclosed in a next step 208. This delivery process begins when the control system opens up automated valves 134 and 135. This begins hydrogen delivery from tanks 124 to fuel cells 120 and similarly the delivery from tanks 125 to fuel cells 121. As noted above, there is a delay between the time control system 136 detects a need and the fuel cells become active. This entire time is bridged by the capacitors. Once the hydrogen is delivered, fuel cells will consume it to produce DC power in a step 210.

During fuel cell operation, the system will continually check to see if the primary source 102 has become available in an inquiry step 212. If primary DC source has returned (e.g., the commercial grid has come back on line) the process will revert to normal operation in step 202. If the primary source has not yet returned, however, the process will continue to loop back to step 210 where the fuel cells continue to carry the load for the facility.

It will be appreciated by persons skilled in the art that the present invention is not limited to what has been particularly shown and described above. Rather, all matter shown in the accompanying drawings or described above is to be interpreted as illustrative and not limiting. Accordingly, the scope of the present invention is defined by the appended claims rather than the foregoing description.

What is claimed is:

1. A system for maintaining DC power to a telecommunications facility comprising:
   means on a circuit for accommodating at least one power distribution unit (PDU), wherein said at least one PDU is connected to a primary DC bus;
   said at least one PDU that supplies said DC power to telecommunications equipment;
   means on said circuit for accepting a primary DC power source that provides power to said circuit via said primary DC bus unless said primary DC power source fails, wherein said primary DC power source is derived from one of a commercial electrical power utility or an electric generator;
   a plurality of fuel cells organized into a first bank of fuel cells and a second bank of fuel cells, wherein the first and second banks of fuel cells are configured to supply DC power to a backup DC bus, wherein the backup DC bus is electrically connected to said primary DC bus as a secondary DC power source for said circuit, wherein said backup DC bus provides power to said circuit if said primary DC power source fails to provide voltage above a predetermined voltage requirement;
   a plurality of fuel tanks comprising a first group of storage tanks and a second group of storage tanks, wherein said first bank of fuel cells is supplied only by said first group of storage tanks, and wherein said second bank of fuel cells is supplied only by said second group of storage tanks; and
   at least one capacitor included on said backup DC bus that facilitates bridging during fuel cell startup.

2. The system of claim 1 further comprising a diode between said primary DC power source and said plurality of fuel cells to prevent power from dissipating to said primary DC power source when said secondary DC power source provides power to said circuit.

3. The system of claim 1, further comprising a control system that detects when said primary DC power source fails to provide said voltage above said predetermined voltage requirement.

4. The system of claim 3 further comprising at least one automated valve located between said plurality of fuel cells and said plurality of fuel tanks that is closed during a normal mode of operation and that is opened by said control system when said primary DC power source fails to provide said voltage above said predetermined voltage requirement, wherein fuel is supplied to said plurality of fuel cells when said at least one automated valve is opened.

5. A power supply system comprising:
   a primary DC bus connected to at least one power-distribution device (PDU) that provides power to telecommunications equipment;
   a primary DC power source connected to said primary DC bus that facilitates providing power to said telecommunications equipment by maintaining DC power to said primary DC bus, wherein said primary DC power source comprises at least one of a commercial electrical power utility or an electric generator, wherein said primary DC power source provides power to said telecommunications equipment via said at least one PDU unless said primary DC power source fails;
   a backup DC bus electrically connected to said primary DC bus by a linking circuit such that DC power maintained on said primary DC bus by said primary DC power source is also maintained on said backup DC bus;
   a plurality of fuel cells organized into a first bank of fuel cells and a second bank of fuel cells, wherein the first and second banks of fuel cells are connected to said backup DC bus, and wherein said plurality of fuel cells provides a secondary DC power source to said telecommunications equipment via said at least one PDU, wherein said plurality of fuel cells provides power if said primary DC power source fails to provide voltage above a predetermined voltage requirement;
   a fuel delivery system comprising a first storage tank and a second storage tank, wherein said first bank of fuel cells is supplied only by said first storage tank and said second bank of fuel cells is supplied only by said second storage tank;
   a first common fuel line that is supplied by said first storage tank, wherein said first common fuel line divides into first individual fuel lines that supply fuel cells in said first bank of fuel cells;
   a second common fuel line that is supplied by said second storage tank, wherein said second common fuel line divides into second individual fuel lines that supply fuel cells in said second bank of fuel cells;
   at least one automated valve, located between said plurality of fuel cells and said first and second storage tanks, that is closed during a normal mode of operation and that is opened when said primary DC power source fails to provide said voltage above said predetermined voltage requirement, wherein fuel is supplied to said plurality of fuel cells when said at least one automated valve is opened; and
   a back-feed diode between said primary DC power source and said telecommunications equipment that prevents power dissipation into said primary DC power source when said plurality of fuel cells provides power to said telecommunications equipment.

6. The system of claim 5 including at least one capacitor connected to said backup DC bus which is adapted to provide power to said telecommunications equipment during delays in fuel cell start up.

7. The system of claim 5 wherein said plurality of fuel cells comprises at least one proton exchange membrane (PEM).

8. The system of claim 6 wherein said plurality of fuel cells are adapted such that they have a collective output which meets or exceeds electrical power requirements of about 2000 A, 48V DC (100 KW).

9. The system of claim 6 wherein each of said at least one capacitor comprises a plurality of capacitors, wherein each of said plurality of capacitors is associated with one of said plurality of fuel cells.

10. The system of claim 5 wherein said primary DC power source includes a conversion device which is adapted to accept AC power from an AC power source and convert said AC power into DC power.

11. The system of claim 6 wherein said fuel delivery system is a hydrogen delivery system.

12. A method of supplying power to a telecommunications facility via at least one power-distribution unit (PDU) on a primary DC bus, the method comprising:
   providing a primary DC power source to said primary DC bus on a circuit, wherein said circuit further comprises a secondary DC power source on a backup DC bus electrically connected to said primary DC bus, wherein the secondary DC power source comprises a plurality of fuel cells that converts fuel received from a plurality of fuel tanks into DC power, wherein the plurality of fuel cells comprises a first group of fuel tanks and a second group of fuel tanks, wherein said plurality of fuel cells is organized into a first bank of fuel cells and a second bank of fuel cells;

supplying fuel to said first bank of fuel cells from said first group of fuel tanks, wherein a first common fuel line that is supplied by said first group of storage tanks divides into first individual fuel lines that supply fuel cells in said first bank of fuel cells;

supplying fuel to said second bank of fuel cells from said second group of fuel tanks, wherein a second common fuel line that is supplied by said second group of storage tanks divides into second individual fuel lines that supply fuel cells in said second bank of fuel cells;

monitoring a voltage on said circuit, wherein said voltage is associated with said primary DC power source;

determining that said voltage is less than a predetermined voltage requirement;

activating said secondary DC power source in response to determining that said voltage is less than said predetermined voltage requirement, wherein activating comprises opening at least one automated valve disposed between said plurality of fuel cells and said plurality of fuel tanks to allow fuel to be received by said plurality of fuel cells, wherein said automated valve is closed during a normal mode of operation; and providing a back-feed diode to prevent dissipation of electrical power into said primary DC power source when said secondary DC power source provides power to said circuit.

13. The method of claim 12, further comprising providing at least one capacitor on said circuit to provide power to said circuit during fuel cell startup.

14. The method of claim 12 wherein said plurality of fuel cells comprises at least one proton exchange membrane (PEM).

15. The method of claim 12, further comprising supplying power to said at least one PDU via said primary DC bus.

16. The method of claim 15, further comprising supplying power to telecommunications equipment via said at least one PDU.

17. The method of claim 12 wherein said diode is located between said at least one capacitor and said primary DC power source.

18. The method of claim 12, wherein said secondary DC power source is activated by a control system that monitors said voltage.

19. The method of claim 12, wherein the method further comprises deactivating said secondary DC power source when said voltage is determined to be greater than said predetermined voltage requirement.

20. The method of claim 12, further comprising:
receiving AC power from a commercial electrical power utility; and
converting said AC power into DC power, thereby providing said primary DC power source.

* * * * *